United States Patent
Shiota et al.

(10) Patent No.: US 12,460,942 B2
(45) Date of Patent: Nov. 4, 2025

(54) MAP SYSTEM, MAP GENERATING PROGRAM, STORAGE MEDIUM, ON-VEHICLE APPARATUS, AND SERVER

(71) Applicant: DENSO CORPORATION, Kariya (JP)

(72) Inventors: Kentarou Shiota, Kariya (JP); Naoki Nitanda, Kariya (JP); Kazuma Ishigaki, Kariya (JP); Shinya Taguchi, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 102 days.

(21) Appl. No.: 17/456,444

(22) Filed: Nov. 24, 2021

(65) Prior Publication Data

US 2022/0082407 A1 Mar. 17, 2022

Related U.S. Application Data

(63) Continuation of application No. PCT/JP2020/021152, filed on May 28, 2020.

(30) Foreign Application Priority Data

May 29, 2019 (JP) .................................. 2019-100268
May 22, 2020 (JP) .................................. 2020-089651

(51) Int. Cl.
G01C 21/00 (2006.01)
(52) U.S. Cl.
CPC ..... G01C 21/3833 (2020.08); G01C 21/3822 (2020.08); G01C 21/387 (2020.08); G01C 21/3885 (2020.08)

(58) Field of Classification Search
CPC ............ G01C 21/3822; G01C 21/3833; G01C 21/387; G01C 21/3885
See application file for complete search history.

(56) References Cited

U.S. PATENT DOCUMENTS

| | | | |
|---|---|---|---|
| 2011/0058747 A1* | 3/2011 | Nakagomi | G06F 18/253 382/195 |
| 2017/0008562 A1 | 1/2017 | Shashua et al. | |
| 2017/0010109 A1* | 1/2017 | Hayon | H04W 4/44 |
| 2019/0001984 A1* | 1/2019 | Huh | B60W 10/08 |
| 2019/0384060 A1* | 12/2019 | Naruse | H04N 23/76 |
| 2020/0363815 A1* | 11/2020 | Mousavian | G06T 7/75 |

(Continued)

FOREIGN PATENT DOCUMENTS

| | | |
|---|---|---|
| JP | 2009-120111 A | 6/2009 |
| JP | 2011-191239 A | 9/2011 |

(Continued)

*Primary Examiner* — Redhwan K Mawari
(74) *Attorney, Agent, or Firm* — Maschoff Brennan (57) ABSTRACT

A map system includes a vehicle apparatus that is mounted to a vehicle. The map system includes an imaging apparatus, a server, and an integrating unit. The imaging apparatus captures an image of a surrounding area of the vehicle. The server generates a map using data that corresponds to feature points extracted from the image captured by the imaging apparatus that is transmitted from the vehicle apparatus. The integrating unit weights the pieces of data that are transmitted from a plurality of vehicle apparatuses based on bias in the pieces of data and generates a map by integrating at least a portion of the plurality of pieces of data based on the weighting.

12 Claims, 6 Drawing Sheets

(56) References Cited

U.S. PATENT DOCUMENTS

2021/0390353 A1* 12/2021 Futatsugi ............ G06V 10/7747
2022/0044031 A1*  2/2022 Shiota .................. G08G 1/0141

FOREIGN PATENT DOCUMENTS

| JP | 2012154669 A   * | 8/2012 | |
|----|------------------|--------|--|
| JP | 2016156973 A   * | 9/2016 | ............ G01C 21/32 |
| JP | 2017-129451 A   | 7/2017 | |
| JP | 2018-25490 A    | 2/2018 | |
| WO | WO-2019000417 A1 * | 1/2019 | ............ G01C 21/32 |

* cited by examiner

MAP SYSTEM, MAP GENERATING PROGRAM, STORAGE MEDIUM, ON-VEHICLE APPARATUS, AND SERVER

CROSS-REFERENCE TO RELATED APPLICATIONS

The present application is a continuation application of International Application No. PCT/JP2020/021152, filed on May 28, 2020, which claims priority to Japanese Patent Application No. 2019-100268, filed on May 29, 2019, and Japanese Patent Application No. 2020-089651, filed on May 22, 2020. The contents of these applications are incorporated herein by reference in their entirety.

BACKGROUND

Technical Field

The present disclosure relates to a map system that generates a map, a map generation program, a storage medium, a vehicle apparatus, and a server.

Related Art

A technology that is related to a system in which positional information of a landmark or the like is recorded using an image that is captured by a camera that is mounted to a vehicle is known. These pieces of information are uploaded to a server or the like, and a sparse map is generated. During traveling of the vehicle, the generated sparse map is downloaded and a position of an own vehicle is determined.

SUMMARY

One aspect of the present disclosure provides a map system that is a system that includes a vehicle apparatus that is mounted to a vehicle. The map system includes an imaging apparatus, a server, and an integrating unit. The imaging apparatus captures an image of a surrounding area of the vehicle. The server generates a map using data that corresponds to the image captured by the imaging apparatus that is transmitted from the vehicle apparatus. The integrating unit weights the pieces of data that are transmitted from a plurality of vehicle apparatuses based on bias in the pieces of data and generates a map by integrating at least a portion of the plurality of pieces of data based on the weighting.

DESCRIPTION OF THE EMBODIMENTS

JP-A-2018-510373 discloses a technology that is related to a system in which positional information of a landmark or the like is recorded using an image that is captured by a camera that is mounted to a vehicle. These pieces of information are uploaded to a server or the like, and a sparse map is generated. During traveling of the vehicle, the generated sparse map is downloaded and a position of an own vehicle is determined.

In a system such as that described above, pieces of probe data that is data that is to be uploaded to the server may differ from one another depending on specifications, attachment position, attitude, and the like of an imaging apparatus such as a camera that is mounted to the vehicle and generates the probe data, even when the pieces of data are of a same location. Conventionally, the server generates a map by integrating all such pieces of probe data. Therefore, accuracy of map generation in the server improves as a number of pieces of probe data increases.

However, when the number of pieces of probe data is small, if bias occurs in the pieces of probe data, improvement in accuracy when the server generates the map may not be achievable. That is, in the conventional technology, when the number of pieces of probe data is small, the accuracy of map generation in the server may decrease.

It is thus desired to provide a map system that is capable of improving accuracy of map generation in a server, a map generation program, a storage medium, a vehicle apparatus, and a server.

An exemplary embodiment to of the present disclosure provides a map system that is a system that includes a vehicle apparatus that is mounted to a vehicle and includes an imaging apparatus that captures an image of a surrounding area of the vehicle, and a server that generates a map using data that corresponds to feature points extracted from the image captured by the imaging apparatus that is transmitted from the vehicle apparatus. The map system includes an integrating unit that weights the pieces of data that are transmitted from a plurality of vehicle apparatuses based on bias in the pieces of data and generates a map by integrating at least a portion of the plurality of pieces of data based on the weighting.

In the above-described configuration, even when bias is present in the pieces of data, that is, pieces of probe data that are transmitted to the server from the plurality of vehicle apparatuses, weighting of the pieces of data is performed based on the bias and the map is generated taking into consideration the weighting. As a result of a configuration such as this, even when the number of pieces of data that are transmitted from the vehicle apparatuses to the server is small, the server can generate a map that has higher accuracy compared to that in the past. Therefore, as a result of the above-described configuration, an excellent effect of improving the accuracy of map generation in the server can be achieved.

A plurality of embodiments will hereinafter be described with reference to the drawings. Here, configurations according to the embodiments that are essentially identical are given the same reference numbers. Descriptions thereof are omitted.

First Embodiment

A first embodiment will be described below with reference to FIG. 1 to FIG. 5.

Figure 1:
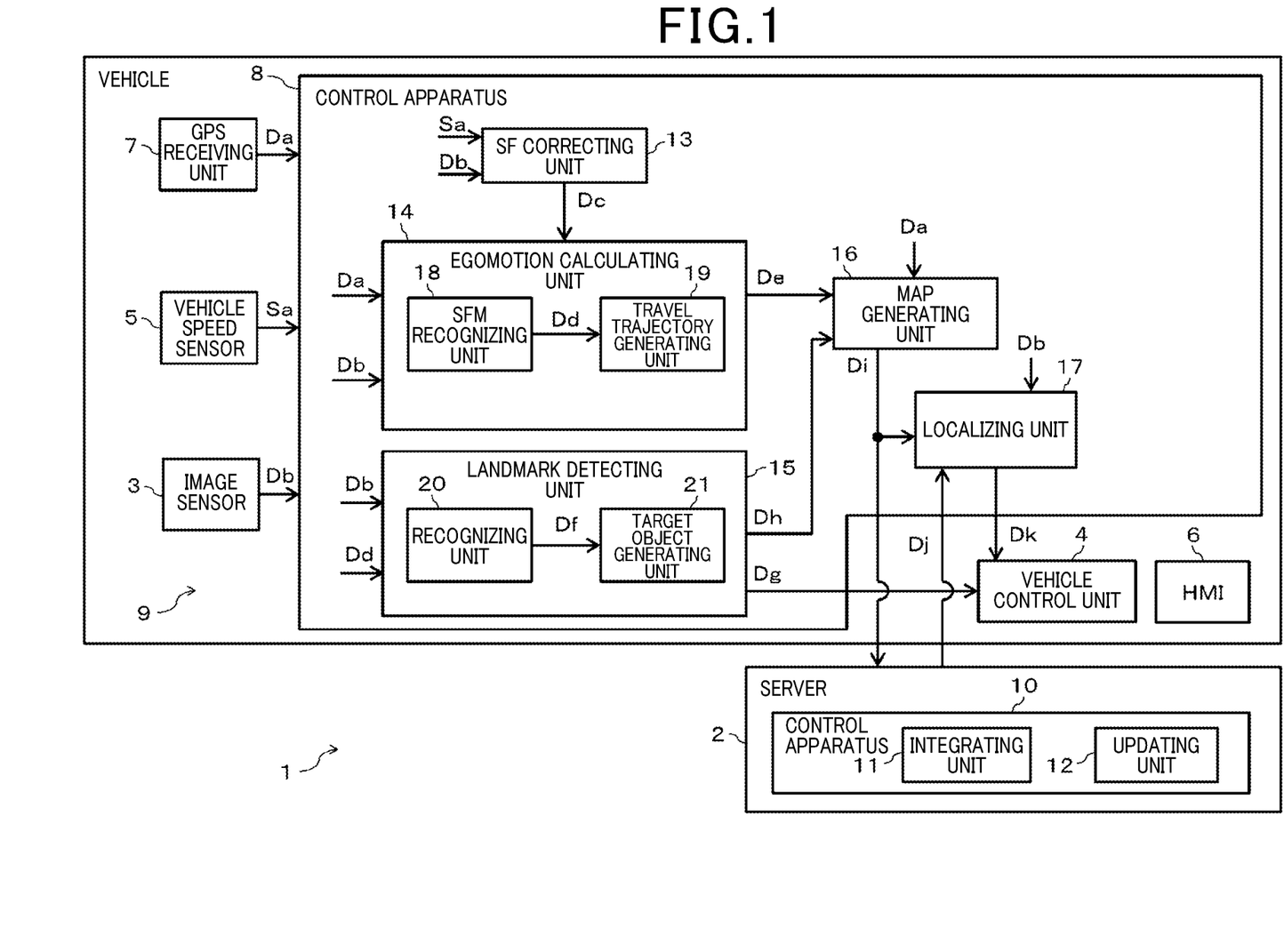
FIG. 1 is a diagram schematically showing a configuration of a map system according to a first embodiment.

A map system 1 shown in FIG. 1 is a map system for autonomous navigation. The map system 1 provides additional function to a conventional function for identifying a position of an own vehicle, such as a global positioning system (GPS), and achieves an effect of identifying the position with higher accuracy. Broadly classified, the map system 1 provides two functions that are map utilization and map update.

In map utilization, map information that is stored in a server 2 is downloaded to a vehicle. The vehicle identifies the position of the own vehicle based on the downloaded map information and a position of a landmark, such as a sign, that is included in an image that is captured by an image sensor 3, such as a camera. In the present specification, the map information that is stored in the server 2 may be referred to as an integrated map. In this case, based on the identified current position of the own vehicle, driving assistance is actualized by a vehicle control unit 4 outputting a corresponding command to an actuator for operating hardware that is mounted to the vehicle. For example, the actuator may be an apparatus for controlling the vehicle through hardware, such as a brake, a throttle, steering, or a lamp.

Meanwhile, in map update, information that is obtained by various sensors, such as the image sensor 3, a vehicle speed sensor 5, and a millimeter-wave sensor (not shown), that are mounted to the vehicle is uploaded to the server 2 as probe data, and the integrated map in the server 2 is successively updated. As a result, for example, the vehicle may actualize driving assistance, automatic steering, and the like, while position identification is performed with high accuracy based on the newest map information at all times.

In the map system 1, a human-machine interface 6 is a user interface through which a user is notified of various types of information and the user transmits a predetermined operation to the vehicle. Here, in the present specification, the human-machine interface may be abbreviated as HMI. For example, the HMI 6 may include a display that is attached to a car navigation apparatus, a display that is provided inside an instrument panel, a head-up display that is projected onto a windshield, a microphone, a speaker, and the like. Furthermore, a mobile terminal, such as a smartphone, that is connected to be capable of communicating with the vehicle can also serve as the HMI 6 in the map system 1.

In addition to visually acquiring information that is displayed in the HMI 6, the user can acquire information through voice, warning sounds, and vibrations. Furthermore, the user can request a desired operation from the vehicle by touch operation of the display or by voice. For example, to receive advanced driving assistance service, such as automatic steering, using the map information, the user may activate the function through the HMI 6. For example, when a "link to map" button that is shown on the display is tapped, the map utilization function may be activated, and downloading of the map information may be started.

In another example, the map utilization function is activated by a command being issued by voice. Here, uploading of map information that is related to map update may be performed at all times while communication between the vehicle and the server 2 is established, or may be performed while the map utilization function is activated by the "link to map" button being tapped. Alternatively, the map utilization function may be activated through a different user interface (UI) that reflects intentions of the user.

The map system 1 according to the present embodiment includes the server 2 and configurations on the vehicle side. The configurations on the vehicle side include the image sensor 3, the vehicle control unit 4, the vehicle speed sensor 5, the HMI 6, a GPS receiving unit 7, a control unit 8, and the like. Among the configurations on the vehicle side, the image sensor 3 and the control apparatus 8 function as a vehicle apparatus 9 that transmits data that corresponds to the image captured by the image sensor 3 to the server 2.

The server 2 is provided in a location that is separated from the vehicle in which the vehicle apparatus 9 and the like are mounted. The server 2 generates a map using the data that corresponds to the image captured by the image sensor 3 that is transmitted from the vehicle apparatus 9. The server 2 includes a control apparatus 10. The control apparatus 10 is mainly configured by a microcomputer that includes a central processing unit (CPU), a read-only memory (ROM), a random access memory (RAM), an input/output (I/O), and the like. The control apparatus 10 includes an integrating unit 11 and an updating unit 12.

These functional blocks are actualized by the CPU of the control apparatus 10 running a computer program that is stored in a non-transitory, tangible recording medium and thereby performing a process that corresponds to the computer program. That is, the functional blocks are actualized by software. Therefore, the computer program that is run by the microcomputer of the control apparatus 10 includes at a least a portion of a program for performing at least a portion of processes related to map generation and map update, that is, a map generation program. The integrating unit 11 and the updating unit 12 are provided to perform various types of processes related to the above-described map update. Details of the processes will be described hereafter.

The GPS receiving unit 7 outputs data Da that indicates GPS information that is indicated by a signal that is received through a GPS antenna (not shown) to the control apparatus 8 and the like. The vehicle speed sensor 5 detects a vehicle speed that is a speed of the vehicle and is configured as a wheel speed sensor that detects a speed of a wheel that is provided in the vehicle. The vehicle speed sensor 5 outputs a signal Sa that indicates a detected speed that is a detection value thereof to the control apparatus 8 and the like.

The image sensor 3 is an imaging apparatus that is mounted to the vehicle and captures an image of an environment surrounding the vehicle, or specifically, an environment within a predetermined area ahead in an advancing direction of the vehicle. Here, the image sensor 3 need not be limited to that which captures an image of the area ahead in the advancing direction of the vehicle and may, for example, be that which captures an image of an area to the rear or to the side. Information on the environment surrounding the vehicle that is captured by the image sensor 3 is stored in a memory (not shown) in a still-image or moving-image format (hereafter, the still image and the moving image are collectively referred to as an image). The control apparatus 8 is configured to be capable of reading data Db that is stored in the memory and performs various processes based on the data Db.

The control apparatus 8 is mainly configured by a microcomputer that includes a CPU, a ROM, a RAM, an I/O unit, and the like. The control apparatus 8 includes functional blocks such as a scale factor correcting unit 13, an egomotion calculating unit 14, a landmark detecting unit 15, a map generating unit 16, and a localizing unit 17. These functional blocks are actualized by the CPU of the control apparatus 8 running a computer program that is stored in a non-transitory, tangible recording medium and thereby performing a process that corresponds to the computer program. That is, the functional blocks are actualized by software.

The control apparatus 8 configures a portion of an onboard apparatus such as an electronic control unit, that is, an ECU that is mounted to the vehicle. The computer program that is run by the microcomputer of the control apparatus 8 includes at a least a portion of a program for performing at least a portion of processes related to map generation and map update, that is, a map generation program. The scale factor correcting unit 13 learns a scale factor of the vehicle speed sensor 5 based on the signal Sa that is provided by the vehicle speed sensor 5 and the data Db that indicates the image that is captured by the image sensor 3.

Here, in the present specification, the scale factor correcting unit may be abbreviated as an SF correcting unit. The scale factor of the vehicle speed sensor 5 refers to a ratio of the detection value of the vehicle speed sensor 5 to a vehicle speed to be measured by the vehicle speed sensor 5, that is, a ratio of change in output to change in input of the vehicle speed sensor 5, and is a coefficient for determining a true value of the vehicle speed from the detection value of the vehicle speed sensor 5. The SF correcting unit 13 detects the vehicle speed of the own vehicle based on the signal Sa that is provided by the vehicle speed sensor 5 and the scale factor that is corrected by learning. The SF correcting unit 13 then outputs data Dc that indicates the detection value to the egomotion calculating unit 14.

The egomotion calculating unit 14 estimates own-vehicle behavior that is behavior of the vehicle based on the image captured by the image sensor 3. In this case, the egomotion calculating unit 14 is configured to estimate the own-vehicle behavior using a Structure From Motion method. In the present specification, Structure From Motion may be abbreviated as SFM. The egomotion calculating unit 14 includes an SFM recognizing unit 18 that is configured by an SFM module and a travel trajectory generating unit 19.

The SFM recognizing unit 18 performs estimation of egomotion and the like based on the data Db, the egomotion being a parameter that indicates own-vehicle behavior, that is, an attitude of the vehicle itself. Here, the egomotion includes information that indicates yaw, roll, pitch, and translational movement. In the above-described configuration, the image sensor 3 captures peripheral images of the vehicle while moving, in accompaniment with the traveling of the vehicle. The SFM recognizing unit 18 extracts feature points that are easily processed, such as corners and edges, from images from two viewpoints that are captured while the image sensor 3 is moving, that is, from images that amount to two frames of which imaging positions differ that are captured at differing timings by a single image sensor 3.

The SFM recognizing unit 18 associates the feature points that are extracted from the images that amount to two frames and calculates optical flows of the feature points based on positional relationships thereof. The SFM recognizing unit 18 estimates a three-dimensional position of each feature point and the attitude of the image sensor 3, that is, the egomotion based on the calculated plurality of optical flows. Here, the SFM recognizing unit 18 can ascertain a movement amount of the own vehicle through a method such as this. However, there is an issue regarding accuracy of scale thereof. Therefore, the SFM recognizing unit 18 acquires a movement speed of the own vehicle based on the data Da that indicates the GPS information and the data Dc that indicates the detection value of the vehicle speed, and improves the accuracy of scale based on the movement speed.

The SFM recognizing unit 18 outputs data Dd that indicates the estimated egomotion to the travel trajectory generating unit 19 and the landmark detecting unit 15. The travel trajectory generating unit 19 integrates the egomotion that is estimated by the SFM recognizing unit 18 every time and generates a travel trajectory that indicates a manner in which the own vehicle has moved. The travel trajectory generating unit 19 outputs data De that indicates the generated travel trajectory to the map generating unit 16.

The landmark detecting unit 15 includes a recognizing unit 20 and a target object generating unit 21. The recognizing unit 20 detects a position of a landmark in the image captured by the image sensor 3 based on the data Db. Here, various methods can be used as a detection method for the position of the landmark. For example, the landmark may include signs, signboards, poles such as utility poles and streetlights, white lines, traffic lights, and the like.

In addition, the recognizing unit 20 recognizes a traveling road of the own vehicle based on the data Db, and acquires road parameters and boundary line information that is information that indicates a boundary line. The road parameters include information that indicates a lane width that is a width of a traffic lane, and a shape of the traffic lane such as a curvature of the traffic lane, that is, the road. In addition, the road parameters also include information that indicates a traveling state of the own vehicle in relation to the shape of the traffic lane, such as offset that indicates a distance from a width-direction center position of the traffic lane to the position of the own vehicle, and a yaw angle that indicates an angle formed by a direction of a tangent of the traffic lane, that is, the road and the advancing direction of the own vehicle.

In this case, traveling road information such as the above-described boundary line information is included in the landmark. The recognizing unit 20 outputs data Df that indicates a detection result of a landmark such as this to the target object generating unit 21. Based on the data Df that is provided by the recognizing unit 20 and the data Dd that is provided by the SFM recognizing unit 18, the target object generating unit 21 collates the detected landmark and the SFM points therein, and thereby determines physical position information that includes a distance and a lateral position of the landmark. The landmark detecting unit 15 outputs data Dg that indicates the road parameters acquired by the recognizing unit 20 to the vehicle control unit 4. In addition, the landmark detecting unit 15 outputs data Dh that indicates information related to the position of the landmark that also includes the traveling road information such as the boundary line information generated by the target object generating unit 21 to the map generating unit 16.

The map generating unit 16 generates map information based on the data Da that indicates the GPS information, the data De that is provided by the egomotion calculating unit 14, and the data Dh that is provided by the landmark detecting unit 15. Specifically, the map generating unit 16 links the GPS information, the generated landmark, and the travel trajectory, and thereby generates map information that is fragmentary map data. In the present specification, the map information that is generated by the map generating unit 16 may be referred to as a probe map.

Data Di that indicates the probe map that is generated by the map generating unit 16 is uploaded to the server 2 as probe data. The data Di is also outputted to the localizing unit 17. Here, in this case, the data Di that is generated by the map generating unit 16 also includes information that indicates a mounting position of the image sensor 3 to the vehicle, a mounting attitude of the image sensor 3 to the vehicle, specifications such as a resolution and an angle of view of the image sensor 3, and the like.

Because accuracy of SFM is limited, it is difficult to say that accuracy of the probe map is sufficient. Therefore, although described in detail hereafter, the integrating unit 11 of the server 2 superimposes a plurality of probe maps based on the data Di that is transmitted from the onboard apparatus of each vehicle, integrates the probe maps, and thereby improves the accuracy of the map. The updating unit 12 of the server 2 updates the integrated map when integration by the integrating unit 11 is successful. The server 2 delivers data Dj that indicates the integrated map to the onboard apparatus of each vehicle. In this case, the server 2 identifies an approximate position of a vehicle that is a delivery destination and delivers the integrated map of a surrounding area of the approximate position (such as an area within a radius of several km centered on the approximate position). Here, when a map is present on the onboard apparatus side, differences from the map may be delivered.

The localizing unit 17 performs localization to estimate a current position of the own vehicle. The localizing unit 17 downloads the data Dj that indicates the integrated map from the server 2 and performs localization of the integrated map based on the downloaded data Dj, the data Di that indicates the probe map, and the data Db that indicates the image captured by the image sensor 3. Here, the localizing unit 17 can also perform localization without using the data Di that indicates the probe map.

When localization is successful, the localizing unit 17 calculates the road parameters that are based on the map information. The localizing unit 17 outputs data Dk that indicates the road parameters that are based on the map information to the vehicle control unit 4. The vehicle control unit 4 performs various processes for controlling the traveling of the own vehicle based on the data Dg that is provided by the landmark detecting unit 15 and the data Dk that is provided by the localizing unit 17. That is, the vehicle control unit 4 performs various processes for controlling the traveling of the own vehicle based on the road parameters.

As described earlier regarding the conventional technology, bias may be present in the pieces of data Di that are transmitted from the vehicle apparatuses 9 that are mounted to a plurality of vehicles. Therefore, the integrating unit 11 of the server 2 determines the bias in the pieces of data Di that are transmitted from the vehicle apparatuses 9 that are mounted to a plurality of vehicles. The integrating unit 11 weights the pieces of data Di based on the bias in the pieces data Di and generates a map by integrating at least a portion of the plurality of pieces of data Di based on the weighting. Here, processes performed by the integrating unit 11 correspond to an integrating means.

Figure 2:
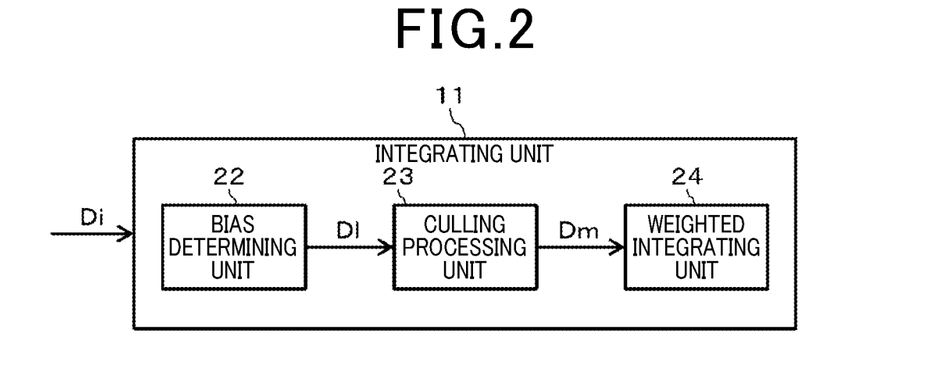
FIG. 2 is a diagram schematically showing a configuration of an integrating unit according to the first embodiment.

As shown in FIG. 2, the integrating unit 11 includes functional blocks such as a bias determining unit 22, a culling processing unit 23, and a weighted integrating unit 24. The bias determining unit 22 performs a process to determine bias in the pieces of data Di that are transmitted from the plurality of vehicles and outputs data Dl that indicates processing results to the culling processing unit 23.

The bias determining unit 22 can determine bias in the pieces of data Di that is based on at least one of the mounting position of the image sensor 3 to the vehicle, the mounting attitude to the vehicle that affects an elevation angle, a tilt angle, and the like of the image sensor 3, and specifications such as the resolution and the angle of view of the image sensor 3. In addition, the bias determining unit 22 can determine bias in the pieces of data Di that is based on the traveling speed of the vehicle. Furthermore, the bias determining unit 22 can determine bias in the pieces of data Di that is based on a surrounding environment of the vehicle.

The culling processing unit 23 performs a culling process in which unnecessary data is culled from the plurality of pieces of data Di and outputs data Dm that indicate processing results to the weighted integrating unit 24. The weighted integrating unit 24 performs an integrating process in which pieces of data from the plurality of pieces of data Di excluding the unnecessary data are superimposed and integrated based on the data Dm. In this case, the weighted integrating unit 24 can weight the pieces of data Di based on estimation accuracy of the egomotion calculating unit 14 regarding the own-vehicle behavior, that is, estimation accuracy when the own-vehicle behavior is estimated using the image that corresponds to the data Db and using the SFM method.

Specifically, the integrating unit 11 can weight the pieces of data Di such that a priority level of the data Di of which the above-described estimation accuracy is determined to be relatively high is higher than a priority level of the data Di of which the estimation accuracy is determined to be relatively low. The integrating unit 11 can perform map generation by preferentially using the data Di that has a higher priority level as a result of weighting such as this being performed.

Next, specific application examples of the processes performed by the integrating unit 11 will be described. Here, processes that are respectively performed by the functional blocks provided in the integrating unit 11 are described as processes that are performed by the integrating unit 11.

[1] FIRST APPLICATION EXAMPLE

A first application example is related to the mounting position, the attitude, the specifications, and the like of the image sensor 3. Regarding the mounting position, the attitude, the specifications, and the like of the image sensor 3, there are those that can be considered advantageous under certain conditions from the perspective of improving the accuracy of map generation, and those that can be considered disadvantageous under other conditions.

For example, when the mounting position of the image sensor 3 is high, distance to a target object that is present in a position that is relatively high, such as a signboard that is provided over an expressway, may become closer and visibility of the target object may become better. Conversely, the distance to a target object that is present in a position that is relatively low, such as a road marking, may become farther and visibility of the target object may become poorer. When the mounting position of the image sensor 3 is a position that is relatively low, the distance to a target object that is present in a position that is relatively low may become closer and visibility of the target object becomes better. Conversely, the distance to a target object that is present in a position that is relatively high becomes farther and visibility of the target object may become poorer.

As a result of the foregoing, when the pieces of data Di are biased towards data of which the mounting position of the image sensor 3 is high, the accuracy of information related to a target object that is present in a position that is relatively low decreases. When the pieces of data Di are biased towards data of which the mounting position of the image sensor 3 is low, the accuracy of information related to a target object that is present in a position that are relatively high decreases. Therefore, the integrating unit 11 performs the culling process, the integrating process, and the like such that the pieces of data Di of which the mounting positions of the image sensors 3, that is, the mounting heights vary can be evenly integrated. As a result, decrease in accuracy related to the above-described information is suppressed.

The integrating unit 11 can also perform a process such as a following to improve the accuracy of information related to a specific target object. That is, to improve the accuracy of information related to a target object that is present in a position that is relatively high, the integrating unit 11 can perform weighting such that the priority level of the data Di of which the height of the mounting position of the image sensor 3 is relatively high is higher. In addition, to improve the accuracy of information related to a target object that is present in a position that is relatively low, the integrating unit 11 can perform weighting such that the priority level of the data Di of which the height of the mounting position of the image sensor 3 is relatively low is higher.

In addition, an amount of flow of a target object at a same height as the height of the mounting position of the image sensor 3 is less apparent. Therefore, the integrating unit 11 can perform weighting such that the priority level of the data Di that includes a target object of which divergence from the height of the mounting position of the image sensor 3 is large is higher. As a result, the accuracy of information related to a specific target object can be improved.

When the angle of view of the image sensor 3 is relatively wide, this is advantageous in terms of acquiring information on a target object that is in a position that is relatively close to the vehicle. Conversely, this is disadvantageous in terms of acquiring information on a target object that is in a position that is relatively far from the vehicle. When the angle of view of the image sensor 3 is relatively narrow, this is advantageous in terms of acquiring information on a target object that is in a position that is relatively far from the vehicle. Conversely, this is disadvantageous in terms of acquiring information on a target object that is in a position that is relatively close to the vehicle.

As a result of the foregoing, when the pieces of data Di are biased towards data of which the angle of view of the image sensor 3 is wide, the accuracy of information related to a target object that is present in a position that is relatively far from the vehicle decreases. When the pieces of data Di are biased towards data of which the angle of view of the image sensor 3 is narrow, the accuracy of information related to a target object that is present in a position that is relatively close to the vehicle decreases. Therefore, the integrating unit 11 performs the culling process, the integrating process, and the like such that the pieces of data Di of which the angles of view of the image sensors 3 vary can be evenly integrated. As a result, decrease in accuracy related to the above-described information is suppressed.

The integrating unit 11 can also perform a process such as a following to improve the accuracy of information related to a specific target object. That is, to improve the accuracy of information related to a target object that is present in a position that is relatively close to the vehicle, the integrating unit 11 can perform weighting such that the priority level of the data Di of which the angle of view of the image sensor 3 is relatively wide is higher. In addition, to improve the accuracy of information related to a target object that is present in a position that is relatively far from the vehicle, the integrating unit 11 can perform weighting such that the priority level of the data Di of which the angle of view of the image sensor 3 is relatively narrow is higher.

Regarding the resolution of the image sensor 3, a higher resolution is generally considered to be more advantageous from the perspective of improving the accuracy of map generation. Therefore, the integrating unit 11 can perform weighting such that the priority level of the data Di of which the resolution of the image sensor 3 is relatively high is higher. However, when the accuracy of information related to a target object that is present in a position that is relatively close to the vehicle is to be improved, or when the accuracy of information related to a target object that is present in a position that is relatively far from the vehicle is to be improved, the priority level is required to be given taking into consideration the angle of view as well, rather than the priority level of the data Di of which the resolution is high being simply increased.

In the case of the data Di that includes image data that is captured such that image sensor 3 captures a target object head-on, because there is little movement of the target object in a lateral direction, accuracy of distance estimation by SFM may decrease. Therefore, the integrating unit 11 can perform weighting such that the priority level of the data Di that includes image data in which a same target object is captured from an adjacent traffic lane is higher. As a result, the integrating unit 11 can generate the map by preferentially using the data Di that includes image data in which the target object is imaged so as to be captured from an angle. Therefore, accuracy thereof improves.

Figure 3:
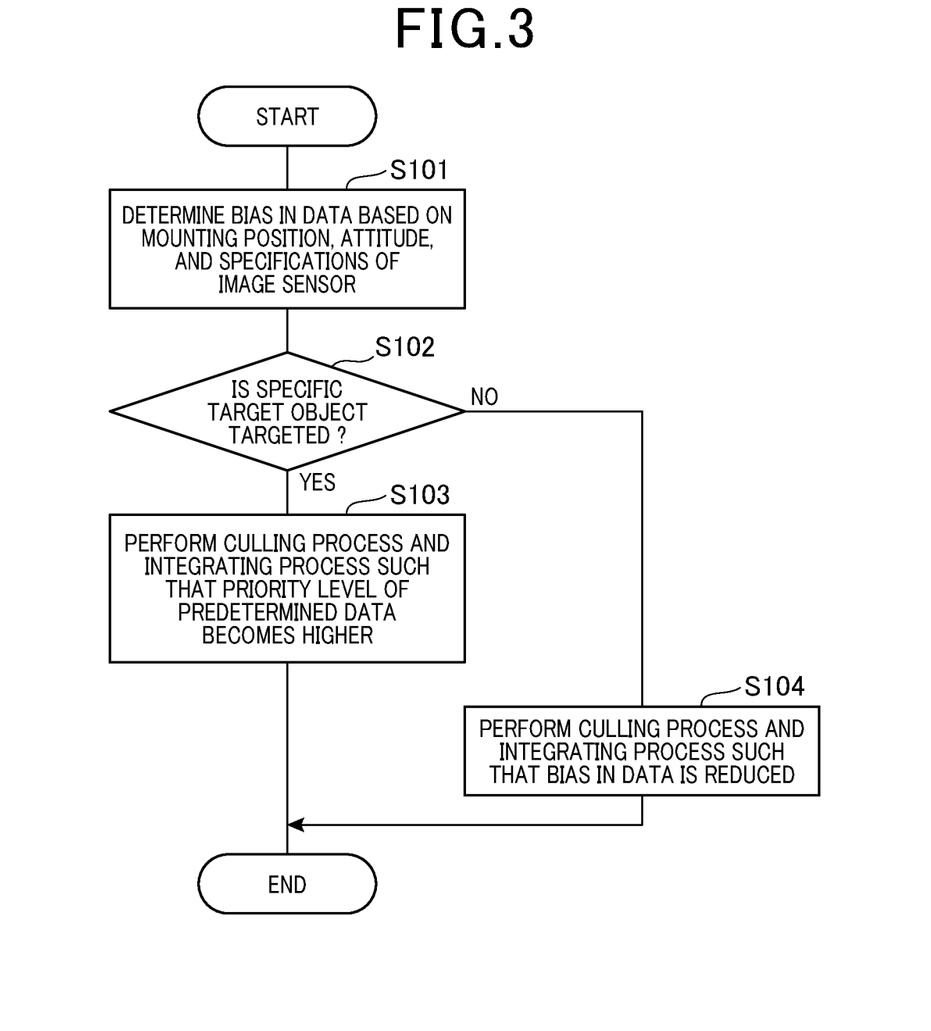
FIG. 3 is a diagram schematically showing a flow of processes performed by the integrating unit in a first application example according to the first embodiment.

A flow of processes performed by the integrating unit 11 in the first application example such as that above is summarized as shown in FIG. 3. As shown in FIG. 3, at step S101, bias in the pieces of data Di that is based on at least one of the mounting position, the mounting attitude, and the specifications of the image sensor 3 is determined. After performing step S101, the integrating unit 11 proceeds to step S102 and determines whether a specific target object is targeted, or specifically, whether the accuracy of information related to a specific target object is required to be improved. Here, when the accuracy of information related to a specific target object is required to be improved, the integrating unit 11 determines "YES" at step S102 and proceeds to step S103.

At step S103, the culling process and the integrating process are performed such that the priority level of predetermined data for improving the accuracy of information related to the specific target object becomes higher. Meanwhile, when the accuracy of information related to a specific target object is not required to be improved, the integrated unit 11 determines "NO" at step S102 and proceeds to step S104. At step S104, the culling process and the integrating process are performed such that the bias in the pieces of data determined at step S101 is reduced. After step S103 and S104 are performed, the present process is ended.

[2] SECOND APPLICATION EXAMPLE

A second application example is related to the traveling speed of the vehicle. It is thought that, as the traveling speed of the vehicle increases, the accuracy of SFM increases because a baseline becomes longer. However, when the traveling speed of the vehicle is too fast, the accuracy of SFM may decrease because a number of frames that can be used for determination decreases. Therefore, the integrating unit 11 performs the culling process, the integrating process, and the like such that the pieces of data Di of which the traveling speeds of the vehicles vary can be evenly integrated. As a result, decrease in the accuracy of SFM is suppressed.

However, when the pieces of data Di of which the traveling speeds of the vehicles vary are able to be evenly integrated in this manner, a number of determinations regarding a specific target object that is positioned in the vicinity of the vehicle may be insufficient. The accuracy of SFM related to this target object may be less than a predetermined determination accuracy. Here, a value of the determination accuracy may be set as appropriate based on the specifications of the map system 1. When determined that the accuracy related to the specific target object does not satisfy the determination accuracy based on the traveling speed of the vehicle, the integrating unit 11 can weight the pieces of data Di in a following manner. That is, the integrating unit 11 can weight the data Di such that the priority level of the data Di of which the traveling speed of the vehicle is relatively slow is higher than the priority level of the data Di of which the traveling speed of the vehicle is relatively fast. As a result, the number of determinations can be increased for the specific target object. Consequently, the accuracy of SFM can be improved.

For example, when the vehicle is traveling through a section of an expressway or the like in which noise barrier walls of a same shape are continuously provided, depending on the traveling speed of the vehicle and a repetition interval of a pattern that is formed by the noise barrier walls, an error in the association of the feature points by the SFM recognizing unit 18, that is erroneous matching may occur. The accuracy of SFM may decrease. To improve accuracy related to a target object such as the above-described noise barrier walls, the integrating unit 11 can integrate the pieces of data Di of which the traveling speeds of the vehicles vary, and lower the priority level of the data Di of which an outlier value is large or eliminate such data Di.

Figure 4:
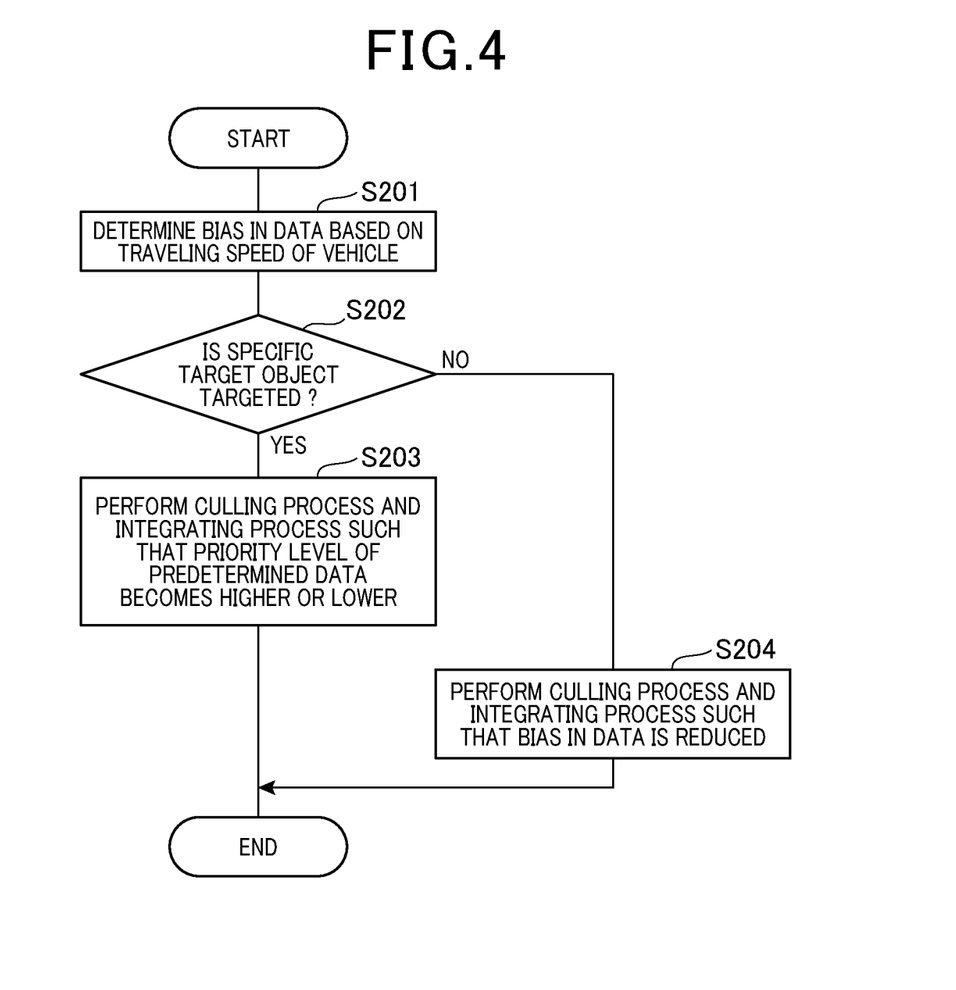
FIG. 4 is a diagram schematically showing a flow of processes performed by the integrating unit in a second application example according to the first embodiment.

A flow of processes performed by the integrating unit 11 in the second application example such as that above is summarized as shown in FIG. 4. As shown in FIG. 4, at step S201, bias in the pieces of data Di that is based on the traveling speed of the vehicle is determined. After performing step S201, the integrating unit 11 proceeds to step S202 and determines whether a specific target object is targeted, or specifically, whether the accuracy of information related to a specific target object is required to be improved. Here, when the accuracy of information related to a specific target object is required to be improved, the integrating unit 11 determines "YES" at step S202 and proceeds to step S203.

At step S203, the culling process and the integrating process are performed such that the priority level of predetermined data for improving the accuracy of information related to the specific target object becomes higher or lower. Meanwhile, when the accuracy of information related to a specific target object is not required to be improved, the integrated unit 11 determines "NO" at step S202 and proceeds to step S204. At step S204, the culling process and the integrating process are performed such that the bias in the pieces of data determined at step S201 is reduced. After step S203 and S204 are performed, the present process is ended.

[3] THIRD APPLICATION EXAMPLE

A third application example is related to the environment such as brightness of a surrounding area of the vehicle. When the brightness of the surrounding area of the vehicle is bright, this is thought to be advantageous from the perspective of improving the accuracy of map generation because noise that affects the accuracy of SFM decreases. However, when the brightness of the surrounding area of the vehicle is bright, a portion of electronic displays and the like becoming blown out and not visible, or flickering occurring in electronic signs can be considered. Consequently, accuracy related to these target objects may decrease.

Therefore, the integrating unit 11 performs the culling process, the integrating process, and the like such that the pieces of data Di that include image data in which the brightness of the surrounding area of the vehicle varies can be evenly integrated, or in other words, such that the data Di that includes image data that is captured during daytime that is a period of time during which the brightness of the surrounding area of the vehicle is bright and the data Di that includes image data that is captured during nighttime that is a period of time during which the brightness of the surrounding area of the vehicle is dark can be evenly integrated. As a result, decrease in the accuracy of SFM is suppressed.

The integrating unit 11 can also perform a process such as the following to improve the accuracy of information related to a specific target object. That is, to improve the accuracy of information related to a target object other than the portion of electronic displays and electronic signs described above, and the like, the integrating unit 11 can perform weighting such that the priority level of the data Di that includes image data that is captured during a period of time, such as daytime, during which the brightness of the surrounding area of the vehicle is bright is higher. In addition, to improve the accuracy of information related to a target object such as the portion of electronic displays and electronic signs described above, the integrating unit 11 can perform weighting such that the priority level of the data Di that includes image data that is captured during a period of time, such as nighttime, during which the brightness of the surrounding area of the vehicle is dark is higher.

Figure 5:
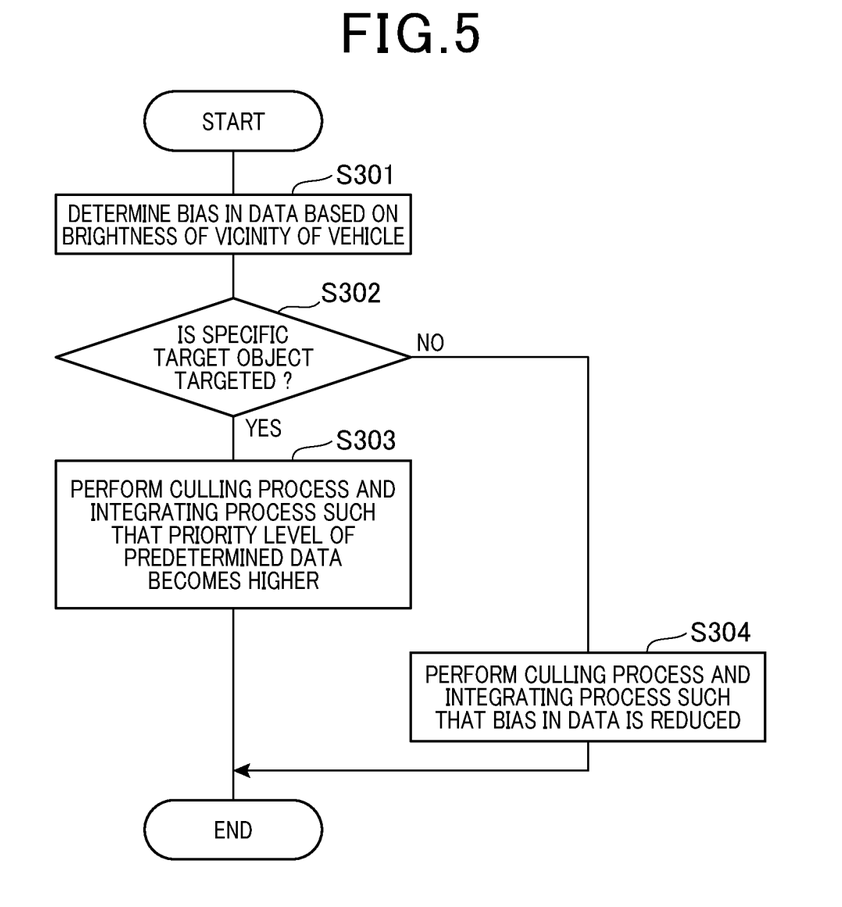
FIG. 5 is a diagram schematically showing a flow of processes performed by the integrating unit in a third application example according to the first embodiment.

A flow of processes performed by the integrating unit 11 in the third application example such as that above is summarized as shown in FIG. 5. As shown in FIG. 5, at step S301, bias in the pieces of data Di that is based on the brightness of the surrounding area of the vehicle is determined. After performing step S301, the integrating unit 11 proceeds to step S302 and determines whether a specific target object is targeted, or specifically, whether the accuracy of information related to a specific target object is required to be improved. Here, when the accuracy of information related to a specific target object is required to be improved, the integrating unit 11 determines "YES" at step S302 and proceeds to step S303.

At step S303, the culling process and the integrating process are performed such that the priority level of predetermined data for improving the accuracy of information related to the specific target object becomes higher. Meanwhile, when the accuracy of information related to a specific target object is not required to be improved, the integrated unit 11 determines "NO" at step S302 and proceeds to step S304. At step S304, the culling process and the integrating process are performed such that the bias in the pieces of data determined at step S301 is reduced. After step S303 and S304 are performed, the present process is ended.

[4] FOURTH APPLICATION EXAMPLE

A fourth application example is related to a state of the vehicle. Immediately after an ignition switch of the vehicle is turned on, accuracy related to correction of the scale factor by the SF correcting unit 13 decreases. Consequently, the accuracy of SFM may decrease. Therefore, the integrating unit 11 performs weighting such that the priority level of the data Di of which elapsed time from when the ignition switch of the vehicle is turned on is relatively short is lower. As a result, decrease in the accuracy of SFM is suppressed.

[5] FIFTH APPLICATION EXAMPLE

A fifth application example is related to a period of time of imaging. There are roads of which a road classification changes depending on the period of time. Specific information related to such roads may only be accurately acquired during a specific time. Therefore, the integrating unit 11 performs the culling process, the integrating process, and the like such that the pieces of data Di of which the periods of time of imaging of image data vary can be evenly integrated. As a result, information related to a road of which the road classification changes depending on the period of time can be accurately acquired.

As described above, the map system 1 according to the present embodiment is a system that includes the vehicle apparatus 9 that includes the image sensor 3 that is mounted to a vehicle and captures an image of the surrounding area of the vehicle, and the server 2 that generates a map using data that corresponds to the image captured by the image sensor 3 that is transmitted from the vehicle apparatus 9. The control apparatus 10 of the server 2 includes the integrating unit 11 that weights pieces of data transmitted from a plurality of vehicle apparatuses 9 based on bias in the pieces of data, and integrates at least a portion of the plurality of pieces of data based on the weighting.

In the above-described configuration, even when bias is present in the pieces of data, that is, the pieces of probe data that are transmitted to the server 2 from a plurality of vehicle apparatuses 9, weighting of the pieces of data is performed based on the bias and the map is generated taking into consideration the weighting. As a result of a configuration such as this, even when the number of pieces of data that are transmitted from the vehicle apparatuses 9 to the server 2 is small, the server 2 can generate a map that has higher accuracy compared to that in the past. Therefore, according to the present embodiment, an excellent effect of improving the accuracy of map generation in the server 2 can be achieved.

In the first application example, the second application example, the third application example, and the fourth application example that are specific application examples of the processes according to the present embodiment, the integrating unit 11 can weight the pieces of data Di such that the priority level of the data Di in which the estimation accuracy of own-vehicle behavior using the SFM method is determined to be relatively high is higher than the priority level of the data Di in which the above-described estimation accuracy is determined to be relatively low. The integrating unit 11 can perform map generation by preferentially using the data Di that has a higher priority level as a result of such weighting being performed. Improvement in the accuracy of SFM, described above, can be given as an indicator of improvement in the accuracy of the integrated map in the server 2. Therefore, as a result of the specific processes such as those described above, the accuracy of map generation in the server 2 can be further improved.

A second embodiment will be described below with reference to FIG. 6 to FIG. 9.

Figure 6:
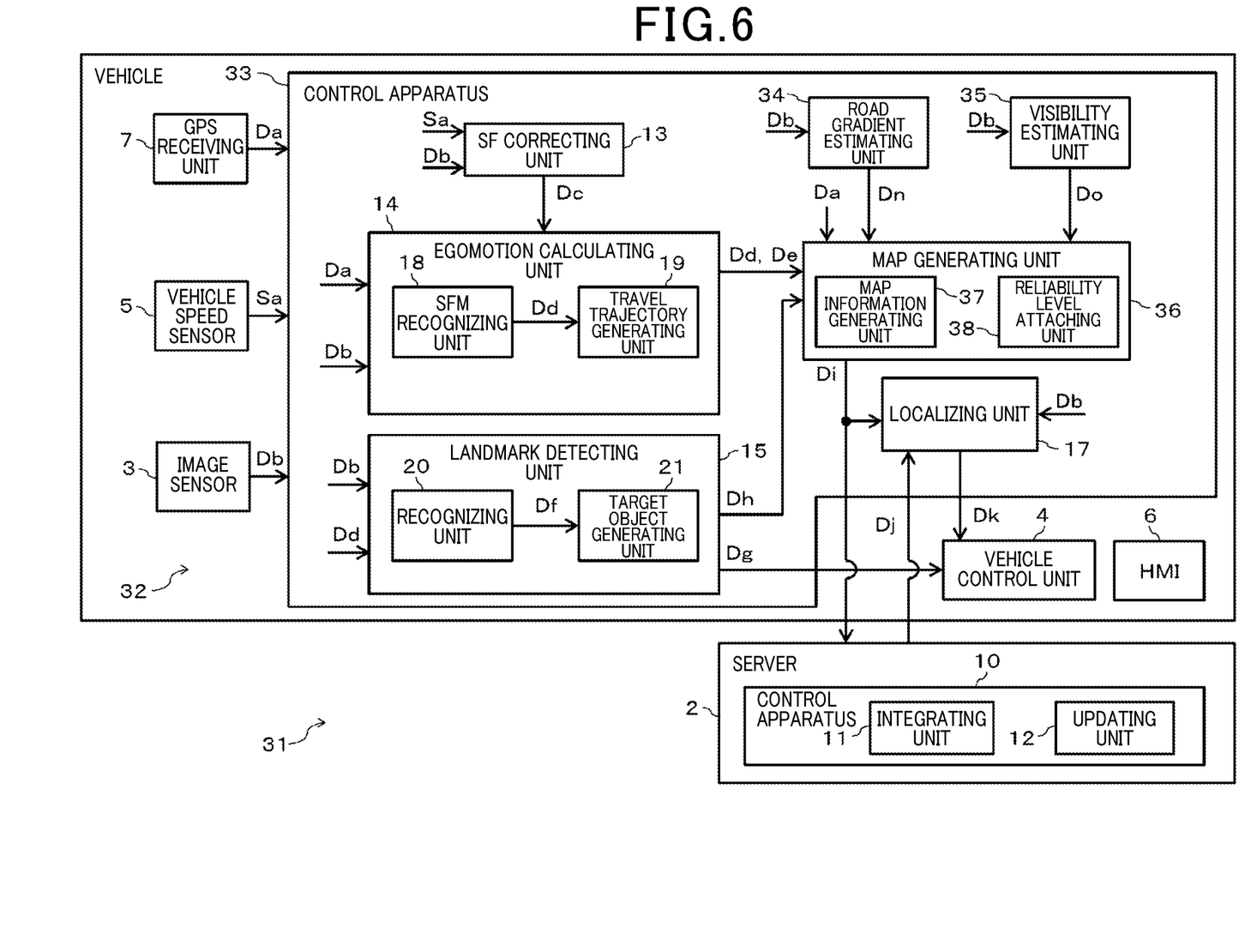
FIG. 6 is a diagram schematically showing a configuration of a map system according to a second embodiment.

As shown in FIG. 6, a map system 31 according to the present embodiment differs from the map system 1 according to the first embodiment in that a vehicle apparatus 32 is provided instead of the vehicle apparatus 9, and the like. A control apparatus 33 of the vehicle apparatus 32 differs from the control apparatus 8 of the vehicle apparatus 9 in that two functional blocks that are a road gradient estimating unit 34 and a visibility estimating unit 35 are added, and a map generating unit 36 is provided instead of the map generating unit 16.

The road gradient estimating unit 34 performs predetermined machine learning based on the data Db that indicates the image captured by the image sensor 3 and thereby estimates a gradient of a road in the image captured by the image sensor 3. The road gradient estimating unit 34 outputs data Dn that indicates the estimated road gradient to the map generating unit 36. The visibility estimating unit 35 performs predetermined machine learning based on the data Db that indicates the image captured by the image sensor 3 and thereby estimates visibility of the image sensor 3. The visibility estimating unit 35 outputs data Do that indicates the estimated visibility to the map generating unit 36.

The map generating unit 36 includes a map information generating unit 37 and a reliability level attaching unit 38. The map generating unit 36 is also provided with the data Dd in addition to the data De from the egomotion calculating unit 14. The map information generating unit 37 generates map information in a manner similar to the map generating unit 16 according to the first embodiment. The reliability level attaching unit 38 attaches reliability level information to the data Di. The reliability level information is information related to a reliability level of the data that correspond to the image captured by the image sensor 3. The reliability level attaching unit 38 evaluates the reliability level of data that correspond to an image based on reliability-level base data that are inputted from the functional blocks. The reliability level attaching unit 38 then generates the reliability level information based on the evaluation result.

The reliability level information is information that is used in the integrating unit 11 of the server 2. That is, as described above, the integrating unit 11 weights the pieces of data Di based on bias in the pieces of data that correspond to images that are transmitted from a plurality of vehicle apparatuses, integrates at least a portion of the plurality of pieces of data Di based on the weighting, and generates a map. In this case, the integrating unit 11 generates the map by integrating the pieces of data Di taking into consideration the reliability level information that is attached to the data Di as well. For example, the integrating unit 11 can perform integration by preferentially using the data Di to which the reliability level information that indicates a relatively high reliability level is attached. Here, the "data that correspond to an image" herein refers not to data that is related to imaging conditions of an image by the image sensor 3, that is, merely landmark and traffic lane information, but to data such as the mounting position, the angle of view, and the resolution of the image sensor 3, and the vehicle speed, the vehicle environment, and the reliability level.

As the reliability-level base data of which origin of information is the data Dd that is inputted from the egomotion calculating unit 14, an SFM low-accuracy flag can be given. The SFM low-accuracy flag is turned on when the estimation accuracy of egomotion may have decreased. As the reliability-level base data of which origin of information is the data Dh that is inputted from the landmark detecting unit 15, a setup position, a size, a type, a color, a success count for SFM position estimation, a continuous extrapolation count, a position at time of success of SFM position estimation, a number of SFM points, a degree of variation in SFM point groups, attributes of SFM point groups, and the like can be given.

The setup position is a setup position of the landmark when viewed from an own-vehicle position. Here, the setup position is a fitting error in the case of a boundary line. For example, as a specific example of reliability level evaluation based on the setup position, an example can be given in which, when the setup position is on a road surface regardless of the landmark being a sign, a likelihood of erroneous detection can be estimated to be high. The size is a size of the landmark. Here, the size is a line width in the case of a boundary line. For example, as a specific example of reliability level evaluation based on the size, an example can be given in which, when four sides of the landmark are less than 0.2 m, when an aspect ratio is an abnormal value, or the like regardless of the landmark being a sign, the likelihood of erroneous detection can be estimated to be high.

For example, as a specific example of reliability level evaluation based on the type, an example can be given in which determination regarding a kind of sign or whether the landmark might not be a sign is performed when the landmark is a sign, and determination regarding line type is performed when the landmark is a boundary line. Therefore, the likelihood of erroneous detection can be suspected based on the determination results or identification results. For example, as a specific example of reliability level evaluation based on the color, an example can be given in which, because identification of line color is performed when the landmark is a boundary line, the likelihood of erroneous detection is present when the line color is determined to be neither white nor yellow.

The success count for SFM position estimation is a number of times that three-dimensional position estimation using SFM points has been successful, or specifically, an integrated value thereof. A higher success count for SFM position estimation is better. In this case, the likelihood of a target object being a landmark increases. Therefore, as a specific example of reliability level evaluation based on the success count for SFM position estimation, an example can be given in which, when the success count for SFM position estimation is extremely low, a likelihood of feature points not being present in the image, that is, a target object not being a landmark can be suspected.

The continuous extrapolation count is a number of times that position estimation by SFM cannot be performed and a position is predicted based on egomotion. A lower continuous extrapolation count is better. In this case, the likelihood of a target object being a landmark increases. Therefore, as a specific example of reliability level evaluation based on the continuous extrapolation count, an example can be given in which, when the continuous extrapolation count is extremely high, a likelihood of feature points not being present in the image, that is, the target object not being a landmark, a likelihood of distance accuracy being low, and the like can be suspected.

The position at time of success of SFM position estimation is the setup position of the landmark when position estimation by SFM is successful. As a specific example of reliability level evaluation based on the position at time of success of SFM position estimation, an example can be given in which, in principle, the distance accuracy decreases as the position becomes farther away. As a specific example of reliability level evaluation based on the number of SFM points, an example can be given in which, because position estimation is performed by an average of feature points corresponding to the recognized landmark being determined or the like, a likelihood of the distance accuracy being high increases as the number of feature points increases.

As a specific example of reliability level evaluation based on the degree of variation in the SFM point groups, a following example can be given. That is, the reliability level decreases as the degree of variation in the SFM point groups increases. In particular, when a distance in a depth direction varies, the likelihood of a target object being a landmark decreases. A reason for this is that, because the landmark is generally flat, the distance in the depth direction of the feature points of the landmark should be fixed. Therefore, variations being present in the distance in the depth direction means that the likelihood of the target object not being a landmark is high.

As a specific example of reliability level evaluation based on the attributes of the SFM point groups, a following example can be given. That is, the SFM point has information on attributes of segmentation, that is, road signs, boundary lines, and the like. Therefore, accuracy increases as a proportion of feature points that have same attributes increases. That is, the distance accuracy increases as a proportion of feature points that have applicable landmark segmentation increases.

As the reliability-level base data of which origin of information is the data Dn that is inputted from the road gradient estimating unit 34, a road gradient estimation state, a fitting error, and the like can be given. The road gradient estimation state indicates whether the road gradient is being estimated. As a specific example of reliability level evaluation based on the road gradient estimation state, an example can be given in which accuracy of data on upward/downward gradients decreases when the road gradient is not being estimated. The fitting error refers to accuracy of gradient estimation, or specifically, an average of an amount of divergence between a fitting curve and the SFM points. As a specific example of reliability level evaluation based on the fitting error, an example can be given in which the accuracy is low when variation in the fitting error is large.

As the reliability-level base data of which origin of information is the data Do that is inputted from the visibility estimating unit 35, a tunnel flag, a glass fogging level, a lens shielding level, a poor weather level, a backlight level, a raindrop attachment level, a road-surface snow level, a desert level, a mud level, a road-surface wetness level, and the like can be given. The tunnel flag is a flag that is turned on during passage through a tunnel. When a same background continues in a tunnel, this causes decrease in SFM egomotion accuracy. Therefore, reliability level evaluation in which accuracy is low when the tunnel flag is on can be performed.

The glass fogging level indicates a degree of fogging of the front windshield of the vehicle. Reliability level evaluation can be performed based on this level. The lens shielding level indicates a degree by which a background is hidden. Reliability level evaluation can be performed based on this level. The poor weather level indicates a degree of poor weather, such as heavy rain, dense fog, heavy snow, and dust. Reliability level evaluation can be performed based on this level.

The backlight level indicates a degree of backlight that is attributed to light from the sun during daytime, and a degree of backlight that is attributed to light from lamps and the like during nighttime. Reliability level evaluation can be performed based on this level. The raindrop attachment level indicates a degree of attachment of raindrops on the front windshield of the vehicle. Reliability level evaluation can be performed based on this level. The road-surface snow level indicates whether snow is present on the road surface. Reliability level evaluation can be performed based on this level.

The desert level indicates whether the road surface is a desert. Reliability level evaluation can be performed based on this level. The mud level indicates whether the road surface is mud. Reliability level evaluation can be performed based on this level. The road-surface wetness level indicates whether the road surface is wet with rain or the like. Reliability level evaluation can be performed based on this level. The reliability level evaluation based on these levels can be performed in multiple stages, such as three stages.

As the reliability-level base data of which origin of information is the data Da that indicates GPS information, GNSS orientation angle, GNSS velocity, DOP, and the like can be given. Here, GNSS is an abbreviation of Global Navigation Satellite System. DOP is an abbreviation of Dilution of Precision. The GNSS orientation angle indicates an orientation angle of the vehicle that is obtained by GNSS positioning, that is, a yaw angle. As a specific example of reliability level evaluation based on the GNSS orientation angle, an example can be given in which GNSS accuracy can be determined to be low when a difference with a yaw angle that is calculated by the vehicle through a yaw rate sensor or the like is large.

The GNSS velocity is a traveling velocity of the vehicle that is obtained by GNSS positioning. As a specific example of reliability level evaluation based on the GNSS velocity, an example can be given in which the GNSS accuracy can be determined to be low when a difference with a vehicle speed that is calculated by the vehicle through the wheel speed sensor or the like is large. The DOP refers to an accuracy decrease rate and generally indicates that accuracy of GNSS positioning results is higher as a numeric value thereof becomes smaller. Therefore, as a specific example of reliability level evaluation based on the DOP, an example can be given in which the accuracy can be determined to be higher as the numeric value of the DOP becomes smaller.

In this manner, the reliability level attaching unit 38 evaluates the reliability level based on the estimation accuracy when the own-vehicle behavior that is the behavior of the vehicle is estimated using the image that corresponds to the data Di and using the SFM method, and generates the reliability level information based on the evaluation results. In addition, the reliability level attaching unit 38 evaluates the reliability level based on the estimation accuracy regarding the road gradient and generates the reliability level information based on the evaluation results. Furthermore, the reliability level attaching unit 38 evaluates the reliability level based on the estimation accuracy regarding visibility of the image sensor 3 and generates the reliability level information based on the evaluation results. Moreover, the reliability level attaching unit 38 evaluates the reliability level based on the information related to a landmark in an image that is detected based on the image that corresponds to the data Di and generates the reliability level information based on the evaluation results.

Next, a specific method related to the generation of reliability level information by the reliability level attaching unit 38 will be described.

[1] First Method

In a first method, the reliability level attaching unit 38 determines a "base point" and a "coefficient" based on the reliability-level base data and determines the reliability level by multiplying the base point by the coefficient. For example, the reliability level may be set at 100 levels that are indicated by numeric values from 1 to 100. The reliability level may decrease as the numeric value becomes smaller. Here, in this case, in a manner similar to the reliability level, the base point is set at 100 levels that are indicated by numeric values from 1 to 100.

Specifically, the reliability level attaching unit 38 calculates at least one base point based on the reliability-level base data. For example, in the case of a sign, the base point is 100 when the size is within prescribed values and the type of the sign, such as a speed limit sign, can be identified. Then, the reliability level attaching unit 38 calculates at least one coefficient based on the reliability-level base data. Here, the coefficient is a value that is equal to or less than 1.0. For example, the coefficient may be set to a smaller value as the continuous extrapolation count increases. The coefficient may be set to a smaller value as the position during position estimation becomes farther from the own vehicle position by a fixed value or greater.

Figure 7:
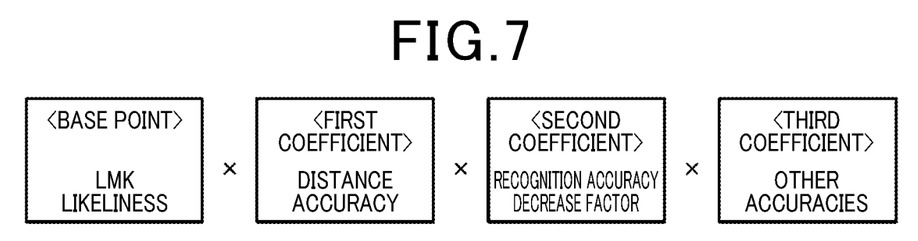
FIG. 7 is a diagram for explaining a specific example of generation of reliability level information by a first method according to the second embodiment.

As a specific example of the generation of reliability level information by the first method, for example, that shown in FIG. 7 can be given. Here, in FIG. 7 and the like, landmark is abbreviated as LMK. In this case, the base point indicates landmark likeliness. In addition, in this case, three coefficients, a first coefficient, a second coefficient, and a third coefficient, are set. The first coefficient is related to distance accuracy. The second coefficient is related to recognition accuracy decrease factor, that is, visibility decrease factor. The third coefficient is related to other accuracies. Here, as the other accuracies, the estimation accuracy regarding road gradient, the SFM accuracy, the GNSS accuracy, and the like can be given. In the specific example by the first method shown in FIG. 7, the reliability level is calculated by the base point being multiplied by the first coefficient, the second coefficient, and the third coefficient.

[2] Second Method

In a second method, the reliability level attaching unit 38 determines the reliability level by calculating two or more base points from the reliability-level base data and adding the two or more base points. In this case, the base points may be sorted so as to be averaged or weighted such that a total of all base points is 100.

Figure 8:
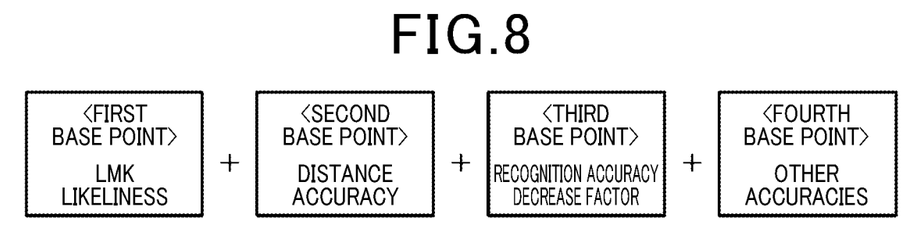
FIG. 8 is a diagram for explaining a specific example of generation of reliability level information by a second method according to the second embodiment.
Figure 9:
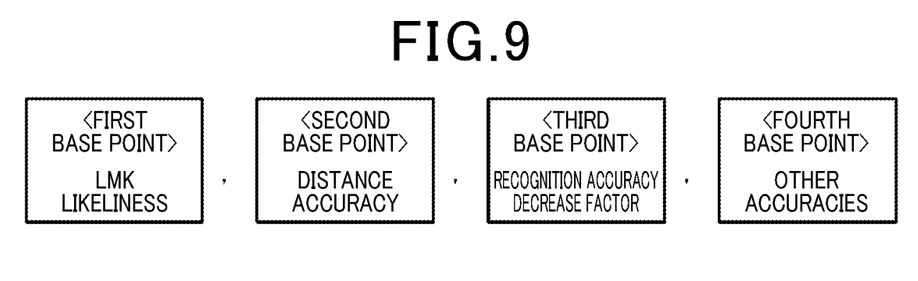
FIG. 9 is a diagram for explaining a specific example of generation of reliability level information by a third method according to the second embodiment.

As a specific example of the generation of reliability level information by the second method, for example, that shown in FIG. 8 can be given. In this case, four base points, a first base point, a second base point, a third base point, and a fourth base point, are set. The first base point indicates the landmark likeliness. The second base point is related to distance accuracy. The third base point is related to recognition accuracy decrease factor. The fourth base point is related to other accuracies.

In this case, the base points are sorted such that each is weighted. Specifically, the first base point is set at 60 levels that are indicated by numeric values from 1 to 60. The second base point is set at 20 levels that are indicated by numeric values from 1 to 20. The third base point and the fourth base point are set at 10 levels that are indicated by numeric values from 1 to 10. In the specific example by the second method shown in FIG. 8, the reliability level is calculated by the first base point, the second base point, the third base point, and the fourth base point being added.

[3] Third Method

In a third method, the reliability level attaching unit 38 determines the reliability level by calculating two or more base points from the reliability-level base data and evaluating each of the two or more base points. In this case, the base points are each set at 100 levels that are indicated by numeric values from 1 to 100. As a specific example of the generation of reliability level information by the third method, for example, that shown in FIG. 9 can be given. In this case, four base points, a first base point, a second base point, a third base point, and a fourth base point, are set in a manner similar to the second method. In the specific example by the third method shown in FIG. 9, the reliability level is calculated by the first base point, the second base point, the third base point, and the fourth base point being individually evaluated.

According to the present embodiment described above, in the vehicle apparatus 32, the map generating unit 36 includes the map information generating unit 37 that generates the map information in a manner similar to the map generating unit 16 according to the first embodiment, and the reliability level attaching unit 38 that attaches the reliability level information that is the information related to the reliability level of the data that corresponds to the image captured by the image sensor 3 to the data Di that is the probe data that is uploaded to the server 2. In addition, according to the present embodiment, in the server 2, the integrating unit 11 generates a map by integrating the pieces of data Di taking into consideration the reliability level information attached to the data Di as well. As a result, an excellent effect of further improving the accuracy of map generation in the server 2 can be achieved.

Other Embodiments

Here, the present disclosure is not limited to the embodiments described above and shown in the drawings. Modifications, combinations, and expansions can be arbitrarily made without departing from the spirit of the invention. Numeric values and the like that are given according to the above-described embodiments are examples. The present disclosure is not limited thereto.

In the map systems 1 and 31, the respective functional blocks may be dispersed. For example, a portion of the functional blocks that are provided in the control apparatus 10 on the server 2 side may be provided on the vehicle side, that is, the control apparatuses 8 and 33 on the vehicle apparatuses 9 and 32 side. The configuration may be such that the processes described according to the above-described embodiments are performed by the control apparatuses transmitting and receiving various pieces of data through communication. As a specific example of such a configuration, a following configuration can be given.

That is, in addition to the data Dj that indicates the integrated map, the server 2 attaches attributes of the probe data that are lacking, such as data that includes image data captured during nighttime being few, data of which the mounting position of the image sensor 3 is a low position being few, or the like. The vehicle apparatuses 9 and 32 determine whether the own vehicle matches the attributes and uploads the data Di only when the attributes match. As a result, only required probe data can be efficiently collected by the server 2, while an amount of communication is suppressed.

In addition, according to the second embodiment, the reliability level attaching unit 38 that is provided in the control apparatus 33 of the vehicle apparatus 32 can be provided in the control apparatus 10 of the server 2. In this case, the vehicle apparatus 32 may be configured to transmit the reliability-level base data to the server 2. In addition, in this case, the reliability level attaching unit 38 that is provided in the server 2 generates the reliability level information based on the reliability-level base data that is transmitted from the vehicle apparatus 32 and attaches the reliability level information to the data Di that is uploaded from the vehicle apparatus 32.

In the vehicle apparatus 32 according to the second embodiment, in principle, regarding the data that corresponds to the image captured by the image sensor 3, past information is not kept. In addition, in the vehicle apparatus 32, regarding a predetermined landmark, data immediately before the landmark becomes obscured from the image captured by the image sensor 3 is uploaded. Therefore, at the time the data Di is uploaded to the server 2, only evaluation based on the reliability-level base data of the frame at this time can be performed. The accuracy of reliability level evaluation may decrease.

For example, information related to the attributes of a landmark may change for each frame, such as a landmark being recognized as a road sign in a certain frame and the landmark being recognized as a street lamp in another frame. Therefore, in the vehicle apparatus 32, the pieces of reliability-level base data are stored in time series. Among the pieces of reliability-level base data, the reliability-level base data that has high frequency may be used and set as a coefficient, or a degree of variation may be set as a coefficient. As a result, the accuracy of reliability level evaluation can be favorably maintained, and further, the accuracy of map generation in the server 2 can be favorably maintained.

In the vehicle apparatus 32 according to the second embodiment, the data Di is selected based on the reliability level information and uploaded. However, the reliability level of the data indicated by the reliability level information may not necessarily be accurate. Therefore, in the vehicle apparatus 32, it is preferable that a measure be taken such that as many pieces of data Di as possible are uploaded while elimination of the data Di is minimized. Then, in this case, the integrating unit 11 of the server 2 may select and integrate the pieces of data Di that are truly required.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The control unit and the method thereof described in the present disclosure may be actualized by a dedicated computer that is provided so as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory tangible recording medium that can be read by a computer as instructions performed by the computer.

What is claimed is:

1. A map system that includes a vehicle apparatus that is mounted to each vehicle of a plurality of vehicles, the map system comprising:
   an image sensor that is included in the vehicle apparatus of a respective vehicle of the plurality of vehicles and configured to capture an image of a surrounding area of the respective vehicle;
   a server configured to
      generate a probe map using data that is transmitted from the respective vehicle, the data corresponding to feature points extracted from the image captured by the image sensor that is transmitted from the vehicle apparatus of the respective vehicle;
      determine bias in the data in which pieces of the data are biased by data of limited accuracy from the image sensor of the respective vehicle, the limited accuracy of the image sensor being determined based on at least one of (i) at least one of a mounting position, a mounting attitude, and a resolution and an angle of view of the image sensor, (ii) a traveling speed of the vehicle, and (iii) a brightness of a surrounding environment of the vehicle;
      weight pieces of data of a plurality of data that is transmitted from the plurality of vehicles based on the determined bias in the pieces of the data; and
      generate a map by integrating at least a portion of the pieces of data of the plurality of data that is transmitted from the plurality of vehicles based on the weighting,
   wherein
   the map is transmitted to at least one vehicle of the plurality of vehicles, and an actuator of the at least one vehicle performs a process for controlling the traveling of the at least one vehicle based on the map, wherein:
   for a state in which an estimation accuracy of an own-vehicle behavior is determined to be relatively high, the server weights the pieces of data such that a priority level of the pieces of data is higher than a priority level of the data in which the estimation accuracy is determined to be relatively low; and
   the estimation accuracy of the own-vehicle behavior being estimated (i) using the respective image that corresponds to the pieces of data and (ii) estimated using a Structure From Motion method.

2. The map system according to claim 1, wherein the server determines bias in the pieces of data that is based on at least one of a mounting position, a mounting attitude, and specifications of the image sensor.

3. The map system according to claim 1, wherein the server determines bias in the pieces of data that is based on a traveling speed of the vehicle.

4. The map system according to claim 3, wherein the server weights the pieces of data such that a priority level of the data of which the traveling speed of the vehicle is relatively slow is higher than a priority level of the data of which the traveling speed of the vehicle is relatively fast, when accuracy related to a target object that is positioned in the vicinity of the vehicle is less than a predetermined determination accuracy based on the traveling speed of the vehicle.

5. The map system according to claim 1, wherein the server determines bias in the pieces of data based on a surrounding environment of the vehicle.

6. A non-transitory computer-readable storage medium storing a map generation program for causing at least either of a vehicle apparatus and a server to perform an integrating step, wherein
   the vehicle apparatus is mounted to each vehicle of a plurality of vehicles and includes an image sensor that captures an image of a surrounding area of a respective vehicle,
   the server generates a probe map using data that is transmitted from the respective vehicle, the data corresponding to feature points extracted from the image captured by the image sensor that is transmitted from the vehicle apparatus of the respective vehicle,
   the integrating step comprises:
      determining bias in the data in which pieces of the data are biased by data of limited accuracy from the image sensor of the respective vehicle, the limited accuracy of the image sensor being determined based on at least one of (i) at least one of a mounting position, a mounting attitude, and a resolution and an angle of view of the image sensor, (ii) a traveling speed of the vehicle, and (iii) a brightness of a surrounding environment of the vehicle;
      weighting pieces of data of a plurality of data that is transmitted from the plurality of vehicles based on the determined bias in the pieces of the data; and
      generating a map by integrating at least a portion of the pieces of data of the plurality of data that is transmitted from the plurality of vehicles based on the weighting,
   wherein
   the map is transmitted to at least one vehicle of the plurality of vehicles, and an actuator of the at least one vehicle performs a process for controlling the traveling of the at least one vehicle based on the map, wherein:
   for a state in which an estimation accuracy of an own-vehicle behavior is determined to be relatively high, the server weights the pieces of data such that a priority level of the pieces of data is higher than a priority level of the data in which the estimation accuracy is determined to be relatively low, and
   the estimation accuracy of the own-vehicle behavior being estimated using the respective image that corresponds to the pieces of data and estimated using a Structure From Motion method.

7. A vehicle apparatus that is mounted to each vehicle of a plurality of vehicles, the vehicle apparatus comprising:
   an image sensor that captures an image of a surrounding area of a respective vehicle of the plurality of vehicles, wherein:
   the vehicle apparatus transmits, to a server, data that corresponds to feature points extracted from the image captured by the image sensor, the server is configured to:
      determine bias in the data in which pieces of the data are biased by data of limited accuracy from the image sensor of the respective vehicle, the limited accuracy of the image sensor being determined based on at least one of (i) at least one of a mounting position, a mounting attitude, and a resolution and an angle of view of the image sensor, (ii) a traveling speed of the vehicle, and (iii) a brightness of a surrounding environment of the vehicle;
      weight pieces of data of a plurality of data that is transmitted from the plurality of vehicles based on the determined bias in the pieces of the data; and generate a map by integrating at least a portion of the pieces of data of the plurality of data that is transmitted from the plurality of vehicles based on the weighting, wherein the map is transmitted to at least one vehicle of the plurality of vehicles, and an actuator of the at least one vehicle performs a process for controlling the traveling of the at least one vehicle based on the map, the vehicle apparatus further comprises:

a processor:

a non-transitory computer-readable storage medium; and a set of computer-executable instructions stored on the non-transitory computer-readable storage medium that cause the processor to attach reliability level information that is information related to a reliability level of the data that corresponds to the image, and the set of computer-executable instructions further cause the processor to evaluate the reliability level based on an estimation accuracy when an own-vehicle behavior, which is a behavior of the vehicle, is estimated using the image that corresponds to the data and estimated using a Structure From Motion method, and generate the reliability level information based on evaluation results thereof.

8. The vehicle apparatus according to claim 7, wherein the data that corresponds to the image is data that is related to imaging conditions of the image by the image sensor.

9. The vehicle apparatus according to claim 7, wherein the set of computer-executable instructions further cause the processor to evaluate the reliability level based on estimation accuracy regarding a road gradient and generates the reliability level information based on evaluation results thereof.

10. The vehicle apparatus according to claim 7, wherein the set of computer-executable instructions further cause the processor to evaluate the reliability level based on estimation accuracy regarding visibility of the image sensor and generates the reliability level information based on evaluation results thereof.

11. The vehicle apparatus according to claim 7, wherein the set of computer-executable instructions further cause the processor to evaluate the reliability level based on information related to a landmark in an image that is detected based on an image that corresponds to the data and generates the reliability level information based on evaluation results thereof.

12. A server that generates a map using data corresponding to feature points extracted from an image that is captured by an image sensor that is provided in a vehicle apparatus that is mounted to each vehicle of a plurality of vehicles, the image sensor being included in the vehicle apparatus of a respective vehicle and configured to capture an image of a surrounding area of the respective vehicle, the data being transmitted from the vehicle apparatus, the server being configured to:

determine bias in the data in which pieces of the data are biased by data of limited accuracy from the image sensor of the respective vehicle, the limited accuracy of the image sensor being determined based on at least one of (i) at least one of a mounting position, a mounting attitude, and a resolution and an angle of view of the image sensor, (ii) a traveling speed of the vehicle, and (iii) a brightness of a surrounding environment of the vehicle;

weight pieces of data of a plurality of data that is transmitted from the plurality of vehicles based on the determined bias in the pieces of the data; and generate a map by integrating at least a portion of the pieces of data of the plurality of data that is transmitted from the plurality of vehicles based on the weighting, wherein the map is transmitted to at least one vehicle of the plurality of vehicles, and an actuator of the at least one vehicle performs a process for controlling the traveling of the at least one vehicle based on the map, wherein:

for a state in which an estimation accuracy of an own-vehicle behavior is determined to be relatively high, the server weights the pieces of data such that a priority level of the pieces of data is higher than a priority level of the data in which the estimation accuracy is determined to be relatively low, and the estimation accuracy of the own-vehicle behavior being estimated using the respective image that corresponds to the pieces of data and estimated using a Structure From Motion method.

\* \* \* \* \*